Patented Mar. 22, 1927.

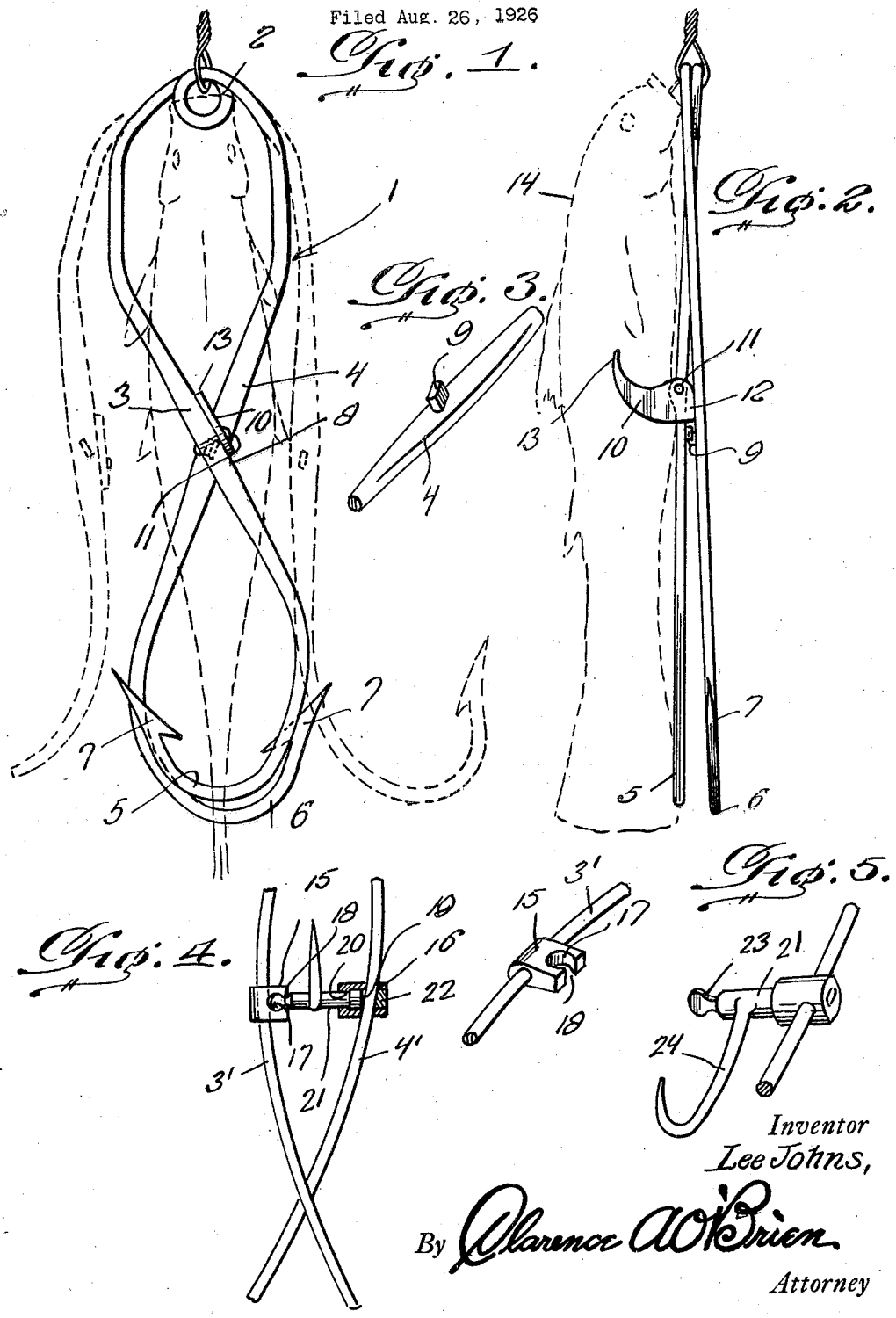

1,622,118

UNITED STATES PATENT OFFICE.

LEE JOHNS, OF MIAMI, FLORIDA.

FISHHOOK.

Application filed August 26, 1926. Serial No. 131,712.

This invention relates to fish hooks, and particularly to a fish hook designed to prevent the fish from releasing the hook after striking.

In fishing for tarpon, considerable difficulty is experienced in landing these fish after they strike the hook for the reason that the fish jump out of the water and by a peculiar motion are enabled on the occurrence of any slack in the line to release themselves from the hook. It is further difficult to maintain a constant tension on the line to prevent the fish from releasing himself from the hook and as the result most fishermen experience numerous losses of their catch from this cause.

An object of this invention is to provide a fish hook having an automatically releasable mechanism for setting the hook in the mouth of the fish as soon as he strikes the bait through the operation of a bait carrying member normally adapted to retain a pair of hooks in set position which are released by the operation of the fish regardless of tension or slack on the fish line, and which will automatically set through their own resiliency and prevent the fish from releasing himself therefrom.

The invention further comprehends the provision of a fish hook wherein a suitable bait holding member is mounted for rotation on one of a pair of spring arms for releasing the arms from a set position to permit the operation of said arms under their own resiliency to engage penetrating points formed at the free ends thereof in the mouth of the fish in such a manner that the fish will be unable to release himself from the hook when the line becomes slack.

The invention comprehends numerous other objects residing in the details of construction, and relation, and construction of the parts which are more particularly pointed out in the following detailed description and in the claims directed to the preferred form of the invention, it being understood however that various changes in the size, shape, and relation of the parts may be made without departing from the spirit and scope of the invention as herein set forth.

In the drawing forming part of this application:

Figure 1 is a side elevation of a hook structure made in accordance with the present invention, showing the bait applied thereto in dotted lines, and also showing the dotted line position of the resilient arm in partially expanded relation.

Figure 2 is an edge elevation of the hook structure in the position shown in Figure 1 illustrating the application of the bait to the bait hook in dotted lines.

Figure 3 is a perspective view of a portion of one of the spring arms showing one of the setting lugs formed thereon.

Figure 4 is a view of the central portion of a pair of spring arms of a hook structure substantially similar to that shown in Figure 1 illustrating a slightly different form of setting mechanism.

Figure 5 is a disassembled perspective view of the setting mechanism shown in Figure 4.

An elongated piece of spring material 1 is formed into a loop 2 at its central portion from which extends a pair of resilient arms 3 and 4, respectively, formed into reversely curved portions terminating at their free ends into reversely curved hooks 5 and 6 respectively provided with the penetrating heads 7 at the terminals thereof. The resiliency of the material of the member from which these arms and hooks are formed, is of such a character that the arms have a normal tendency to extend outwardly in diverging relation from the coil 2 in order that the hooks 5 and 6 will project outwardly as illustrated by the dotted lines shown in Figure 1 in which the arms are shown in a partially extended position to illustrate this feature. Figure 1 illustrates the arms and hooks 5 and 6 in what may be termed the set position, in which the material of the strip 1 is under tension to force the arms outwardly as soon as released, and for the purpose of retaining these arms in the set position each is provided on its adjacent face at the point of crossing indicated at 8 with an angularly disposed lug 9 shown clearly in Figure 3. The lug on each arm is adapted to be engaged in the manner illustrated in Figures 1 and 2 for cooperation to retain the arms in the set position shown in Figure 1 by the full lines.

A cam member 10 is pivotally mounted at 11 on the edge portion of one of the hooks adjacent to the lug 9 in the manner shown in Figures 1 and 2 and in the set position of the hooks with the arms crossing as indicated at 8. The squared end indicated at 12 in Figure 2 is adapted to engage the arm 4, the pivot 11 being on the arm 3. The opposite end of the cam member 10 is formed into the hook 13 which is adapted to provide a bait holder for receiving the bait indicated at 14 in dotted lines, the body of which is placed on the hook 13 in such a manner that as soon as the fish strikes the bait, it will have a tendency to pull the same from the hook and in this pulling action during the strike the cam member 10 will be moved on on its pivot 11 to disengage the lugs 9 from each other which will permit the immediate movement of the arms 3 and 4 under the resiliency of the material of the strips and the coil portion 2 to move in the diverging relation to a greater extent than that indicated in dotted lines in Figure 1, and sufficient to engage in the sides of the mouth of the fish, and through the provision of the penetrating heads or points 7 will work their way into the mouth of the fish in such manner that it will be impossible for the fish to maneuver the hook in its mouth for releasing himself therefrom. On the other hand the hook will have a tendency to work deeper into the fish through the tendency of the material moving the arms 3 and 4 apart in their diverging relation.

Referring to Figures 4 and 5, a construction involving the rotary principle of releasing the hooks as shown in Figures 1 and 3 is illustrated in which a pair of block members 15 and 16 are mounted on the arms 3' and 4', respectively. The block member 15 is formed with a cylindrical transversely extending bore 17 with which communicates the narrow slot 18 opening through the inner face of the block and which extends transversely to the plane of the arm 3'. The block member 16 is formed with a recess 19 with which communicates the reduced opening 20 for rotatably receiving the headed rotary pin 21 and through the medium of the plug 22 retains these parts in assembled relation on the arm 4'. The free end of the rotary pin 21 is formed with a reduced headed extension 23 having a thickness less than the width of the slot 18 and in a plane at right angles thereto provided with a contour similar to the bore 17, and slot 18 for releasable engagement therein. The central portion of the rotary pin 21 is provided with a laterally extending bait hook 24 on which the bait is mounted similar to the structure shown in Figures 1 to 3.

The arms 3' and 4' are pressed into overlapping relation as shown in Figure 4, and the head 23 positioned to engage in the bore 17 of the slot 18 as shown in Figure 4, in which position the hook 24 extends laterally to the plane of the arms 3' and 4' so that the head 23 will interlock with the block 15 as shown in Figure 4 to retain the arms in the set position. Upon a fish's striking the hook and moving the bait, a slight rotation of the bait hook 24 with the bait will serve to release the head 23 from the bore 17 in block 15 and permit the arms 3' and 4' through their own resiliency to spring outwardly in diverging relation for setting the headed end of the hook in the mouth of the fish.

In the practical use of these hooks it has been found that the fish are unable to release themselves as heretofore indicated from this hook structure after striking, and that the hooks will release very readily. Considerable slack in the line with the use of one of the hooks has been given a tarpon making a strike on the hook structure, and through his continued strenuous efforts to release the hook from its mouth with the numerous methods these fish employ has failed.

It should therefore be clear from the above description that a highly novel and efficient mechanism has been provided for retaining a pair of normally diverging resilient hook members in tensioned relation with suitable bait supporting means operated by the movement of the bait upon the striking of the hook for automatically releasing the arm and permitting the operation of the hooks.

Having thus described the invention, what I claim as new and desire to secure by Letters Patent is:—

1. A fish hook, comprising a pair of resiliently connected arms normally adapted to extend in diverging relation, said arms having penetrating prongs formed at the free ends thereof and adapted to be brought into adjacent tensioned relation, means adapted to retain the arms in tensioned relation, and rotary means adapted to support bait and operate the last-mentioned means in the rotation thereof to release said arms.

2. A fish hook, comprising a pair of resiliently connected arms normally adapted to extend in diverging relation, said arms having penetrating prongs at the free ends thereof, lugs formed on the arms intermediate the ends adapted to be engaged for setting said arms in tensioned relation, and a rotatable bait holder carried by one arm for engagement with the other arm to disengage said lugs and release said arms from the set position.

3. A fish hook, comprising a pair of resiliently connected arms normally adapted to extend in diverging relation, said arms having penetrating prongs at the free ends thereof and adapted to be moved under tension into crossing relation, cooperating means on said arms at a predetermined point of crossing adapted to retain the arms in tensioned set relation, and bait holding means mounted on one of the arms and rotatable upon movement of bait secured thereon longitudinally of said arms for releasing said cooperating means and permitting movement of said arms under their inherent resiliency to the diverging relation.

4. A fish hook, comprising a pair of resiliently connected arms normally adapted to extend in diverging relation, said arms having penetrating prongs at the free ends, lugs formed on the arms intermediate the ends projecting laterally and adapted for overlapped engagement to set the arms in tensioned relation, and a cam member rotatably mounted on one arm having engagement with the other arm and formed to carry bait, the rotation of the cam member in one direction separating said arms and disengaging said lugs.

In testimony whereof I affix my signature.

LEE JOHNS.